United States Patent [19]

Williams et al.

[11] 4,365,975

[45] Dec. 28, 1982

[54] USE OF ELECTROMAGNETIC RADIATION TO RECOVER ALKALI METAL CONSTITUENTS FROM COAL CONVERSION RESIDUES

[75] Inventors: Rollie B. Williams; Ramachandra A. Nadkarni, both of Baytown, Tex.

[73] Assignee: Exxon Research & Engineering Co., Florham Park, N.J.

[21] Appl. No.: 280,750

[22] Filed: Jul. 6, 1981

[51] Int. Cl.$^3$ .............................................. C10J 3/54
[52] U.S. Cl. .................................. 48/197 R; 48/210; 204/157.1 R; 208/9; 252/412; 252/420; 423/206 R; 423/208
[58] Field of Search ...................... 48/197 R, 202, 210; 252/373, 412, 420; 423/206, 208; 208/9; 204/157.1 R

[56] References Cited

U.S. PATENT DOCUMENTS 3,998,607 12/1976 Wesselhoft ........................ 48/197 R
4,148,614  4/1979 Kirkbride .
4,152,120  5/1979 Zavitsanos et al.
4,193,771  3/1980 Sharp et al. ...................... 48/197 R

FOREIGN PATENT DOCUMENTS 1567129 5/1980 United Kingdom .

OTHER PUBLICATIONS

Barrett, P., Davidowsky, Jr. L. J., Penaro, K. W. and Copeland, T. R., "Microwave Oven-Based Wet Digestion Technique", *Analytical Chemistry*, vol. 50, No. 7, Jun. 1978.

Abu-Samra, A., Morris, J. S. and Koirtyohann, S. R., "Wet Ashing of Some Biological Samples in a Microwave Oven", *Analytical Chemistry*, vol. 47, No. 8, Jul. 1975.

*Primary Examiner*—Peter F. Kratz
*Attorney, Agent, or Firm*—Yale S. Finkle

[57] ABSTRACT

In a coal gasification operation or similar conversion process carried out in the presence of an alkali metal-containing catalyst wherein particles containing alkali metal residues are produced, alkali metal constituents are recovered from the particles by treating them with electromagnetic radiation having a frequency between about 0.10 MHz and about $10^5$ MHz in the presence of water or other aqueous medium. During the treatment step, the electromagnetic radiation facilitates the extraction of alkali metal constituents from the water-insoluble alkali metal compounds comprising the alkali metal residues. The resultant aqueous solution enriched in water-soluble alkali metal constituents is then separated from the particles depleted in alkali metal constituents and recycled to the gasification process where the alkali metal constituents serve as at least a portion of the alkali metal constituents which comprise the alkali metal-containing catalyst.

12 Claims, 2 Drawing Figures

USE OF ELECTROMAGNETIC RADIATION TO RECOVER ALKALI METAL CONSTITUENTS FROM COAL CONVERSION RESIDUES

BACKGROUND OF THE INVENTION

This invention relates to the conversion of coal and similar carbonaceous solids in the presence of an alkali metal-containing catalyst and is particularly concerned with the recovery of alkali metal constituents from spent solids produced during coal gasification and similar operations and their reuse as constituents of the alkali metal-containing catalyst.

It has long been recognized that certain alkali metal compounds can be employed to catalyze the gasification of carbonaceous materials such as coal and other carbonaceous solids. Studies have shown that potassium carbonate, sodium carbonate, cesium carbonate and lithium carbonate will substantially accelerate the rate at which steam, hydrogen, carbon dioxide, oxygen and the like react with bituminous coal, subbituminous coal, lignite, petroleum coke, organic waste materials and similar carbonaceous solids to form methane, carbon monoxide, hydrogen, carbon dioxide and other gaseous products. It has been found that of the alkali metal carbonates, cesium carbonate is the most effective gasification catalyst, followed by potassium carbonate, sodium carbonate, and lithium carbonate, in that order. Because of the relatively high cost of cesium carbonate and the low effectiveness of lithium carbonate, most of the experimental work in this area which has been carried out in the past has been directed towards the use of potassium and sodium carbonate. The catalytic activity of sodium carbonate, however, is substantially lower than that of potassium carbonate, therefore, attention has been focused in the past on the use of potassium carbonate as a gasification catalyst.

Coal gasification processes and similar operations carried out in the presence of alkali metal compounds at high temperatures generally result in the formation of chars and alkali metal residues. Coal and other carbonaceous solids used in such operations normally contain mineral constituents that are converted to ash during the gasification process. Although the composition of ash varies, the principal constituents, expressed as oxides, are generally silica, alumina, and ferric oxide. The alumina is usually present in the ash in the form of aluminosilicates. Studies indicate that at least a portion of the alkali metal compounds that are used as gasification catalyst constituents react with aluminosilicates and other ash constituents to form alkali metal residues containing water-soluble alkali metal carbonates, sulfates and the like and normally water-insoluble, catalytically inactive materials such as alkali metal aluminosilicates. Thus, the chars produced during coal gasification and similar conversion processes will contain, in addition to carbonaceous material and ash, alkali metal residues comprised of both water-soluble alkali metal constituents and water-insoluble alkali metal constituents. It is generally advisable to withdraw a portion of the char from the reaction zone during gasification and similar operations in order to eliminate the ash and alkali metal residues and prevent their building up within the reaction zone or other vessels in the system.

In gasification and other processes referred to above that utilize alkali metal-containing catalysts, the cost of the alkali metal constituents is a significant factor in determining the overall cost of the process. In order to maintain catalyst costs at a reasonable level, it is important that the alkali metal constituents be recovered and reused. One common method of recovering the alkali metal constituents is to wash the char particles removed from the reaction zone with water in order to leach out the water-soluble alkali metal constituents. Since the alkali metal is present in the form of both water-soluble and water-insoluble compounds, it has been found that only between about 70 and 80 percent of the alkali metal present in the char particles can normally be recovered by washing with water and therefore substantial quantities of makeup alkali metal compounds are required and add appreciably to the cost of the conversion process.

It has been proposed to recover the alkali metal constituents ties up as water-insoluble alkali compounds from the char particles along with the water-soluble alkali metal constituents by treating the char particles with lime in the presence of water at a temperature between about 250° F. and 700° F. The calcium ions from the lime evidently react with alkali metal aluminosilicates and other normally water-insoluble alkali metal compounds in the char particles to produce alkali metal constituents which dissolve in the water to form an aqueous solution. The resultant solution is recycled to the catalyst impregnation zone of the process where the alkali metal constituents are incorporated into the feed material for reuse as at least a portion of the alkali metal-containing catalyst. Although this procedure can result in the recovery of about 90 weight percent of the alkali metal constituents present in the char, the slurry effluent from the treatment step will contain a large quantity of fine lime particles which tend to make separations of the solids from the slurry effluent to produce the aqueous recycle solution difficult to achieve with a high degree of efficiency in a short period of time. More stages and larger equipment are normally required to effect such separations and this, in turn, results in an expensive extraction system which is costly to operate. Thus, there are major disadvantages connected with using the lime digestion technique to increase the recovery of catalyst constituents.

SUMMARY OF THE INVENTION

The present invention provides an improved process for the recovery of alkali metal constituents from mixtures of char, ash and alkali metal residues produced during coal gasification and other conversion processes carried out in the presence of an alkali metal-containing catalyst, preferably a potassium-containing catalyst. In accordance with the invention, it has now been found that large amounts of alkali metal constituents can be recovered from particles containing alkali metal residues produced during coal gasification and related high temperature conversion processes without producing fine particles that interfere with subsequent liquid-solids separations by treating the particles with electromagnetic radiation having a frequency between about 0.10 MHz and about $10^5$ MHz in the presence of water or an aqueous medium. During the treating process, the electromagnetic radiation evidently facilitates the extraction of alkali metal constituents from the water-insoluble compounds which comprise the alkali metal residues thereby producing an aqueous solution containing a relatively large amount of water-soluble alkali metal constituents and particles depleted in alkali metal constituents. The alkali metal constituents present in the aqueous solution produced during the treatment step are then used in the conversion process as at least a portion of the alkali metal constituents which comprise the alkali metal-containing catalyst. Preferably, such use is achieved by recycling the aqueous solution directly to the conversion process. If desired, however, the alkali metal constituents may first be recovered from the solution and then used in the conversion process.

The process of the invention, unlike similar catalyst recovery processes proposed in the past, results in the substantial recovery of the alkali metal constituents present in the alkali metal residues withdrawn with the char from the conversion process without producing fine particles which could interfere with subsequent liquid-solids separations. By decreasing the amount of makeup alkali compounds that is required and by obviating the need for any complex equipment needed to make liquid-solids separations, the invention makes possible substantial savings in gasification and other conversion operations carried out in the presence of alkali metal-containing catalysts and permits the generation of product gases and/or liquids at significantly lower cost than would otherwise be the case.

DESCRIPTION OF THE PREFERRED EMBODIMENT

Figure 1:
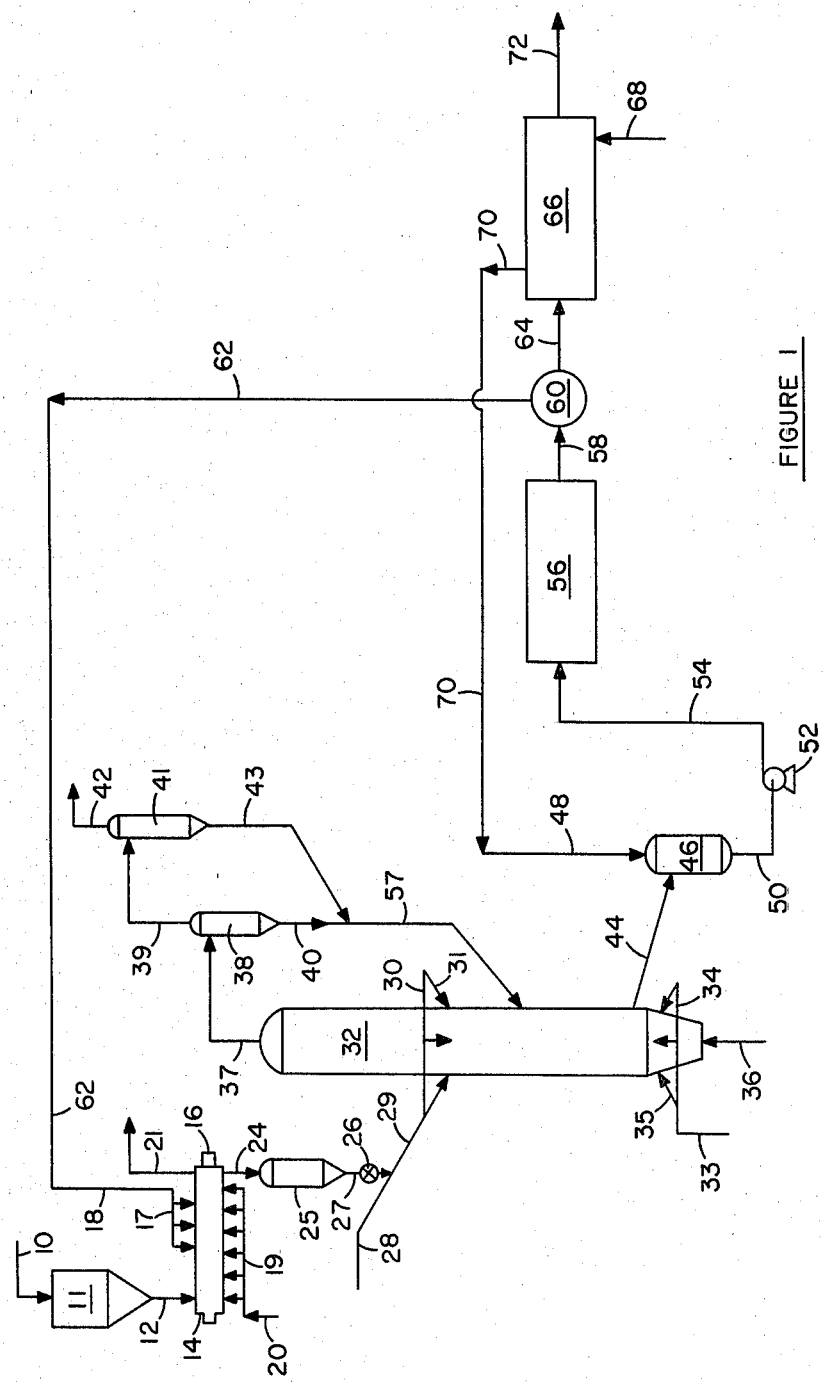
FIG. 1 in the drawing is a schematic flow diagram of a catalytic coal gasification process in which the alkali metal constituents of the catalyst are recovered and reused in the process.

The process depicted in FIG. 1 is one for the production of methane by the gasification of a bituminous coal, subbituminous coal, lignitic coal or similar carbonaceous solid with steam at high temperature in the presence of a carbon-alkali metal catalyst prepared by impregnating the feed solids with a solution of an alkali metal compound or a mixture of such compounds and thereafter heating the impregnated material to a temperature sufficient to produce an interaction between the alkali metal and the carbon present. It will be understood that the alkali metal recovery system disclosed is not restricted to this particular gasification process and that it can be employed in conjunction with any of a variety of other conversion processes in which alkali metal compounds or carbon-alkali metal catalysts are used to promote the reaction of steam, hydrogen, oxygen or the like with carbonaceous feed materials to produce a char, coke or similar solid product containing alkali metal residues from which alkali metal compounds are recovered for reuse as the catalyst or a constituent of the catalyst. It can be employed, for example, for the recovery of alkali metal compounds from various processes for the gasification of coal, petroleum coke, organic waste materials and similar solids feed streams which produce spent carbonaceous solids. Other conversion processes with which it may be used include operations for the carbonization of coal and similar feed solids, for the liquefaction of coal and related carbonaceous materials, for the retorting of oil shale, for the partial combustion of carbonaceous feed materials and the like. Such processes have been disclosed in the literature and will be familiar to those skilled in the art.

In the process depicted in FIG. 1, a solid carbonaceous feed material such as bituminous coal, subbituminous coal, lignitic coal or the like that has been crushed to a particle size of about 8 mesh or smaller on the U.S. Sieve Series Scale is passed into line 10 from a feed preparation plant or storage facility that is not shown in the drawing. The solids introduced into line 10 are fed into a hopper or similar vessel 11 from which they are passed through line 12 into feed preparation zone 14. This zone contains a screw conveyor or similar device, not shown in the drawing, that is powered by motor 16, a series of spray nozzles or similar devices 17 for the spraying of alkali metal-containing solution supplied through line 18 onto the solids as they are moved through the preparation zone by the conveyor, and a similar set of nozzles or the like 19 for the introduction of a hot dry gas, such as flue gas, into the preparation zone. The hot gas, supplied through line 20, serves to heat the impregnated solids and drive off the moisture. A mixture of water vapor and gas is withdrawn from the feed preparation zone through line 21 and passed to a condenser, not shown, from which water may be recovered for use as makeup or the like. The alkali metal-containing solution is recycled through line 62 from the alkali metal recovery section of the process, which is described in detail hereinafter.

It is preferred that sufficient alkali metal-containing solution be introduced into feed preparation zone 14 to provide from about 1 to about 50 weight percent of the alkali metal compound or mixture of such compounds on the coal or the other carbonaceous solids. From about 5 to about 20 weight percent is generally adequate. The dried impregnated solid particles prepared in zone 14 are withdrawn through line 24 and passed to a closed hopper or similar vessel 25. From here they are discharged through a star wheel feeder or equivalent device 26 in line 27 at an elevated pressure sufficient to permit their entrainment into a stream of high pressure steam, recycle product gas, inert gas, or other carrier gas introduced into line 29 via line 28. The carrier gas and entrained solids are passed through line 29 into manifold 30 and fed from the manifold through feed lines 31 and nozzles, not shown in the drawing, into the gasifier 32. In lieu of or in addition to hopper 25 and star wheel feeder 26, the feed system may employ parallel lock hoppers, pressurized hoppers, aerated standpipes operated in series, or other apparatus to raise the input feed solids stream to the required pressure level.

Gasifier 32 comprises a refractory lined vessel containing a fluidized bed of carbonaceous solids extending upward within the vessel above an internal grid or similar distribution device not shown in the drawing. The bed is maintained in the fluidized state by means of steam introduced through line 33, manifold 34 and peripherally spaced injection lines and nozzles 35 and by means of recycle hydrogen and carbon monoxide introduced through bottom inlet line 36. The particular injection system shown in the drawing is not critical, hence other methods for injecting the steam and recycle hydrogen and carbon monoxide may be employed. In some instances, for example, it may be preferred to introduce both the steam and recycle gases through multiple nozzles to obtain more uniform distribution of the injected fluid and reduce the possibility of channeling and related problems.

The injected steam reacts with carbon in the feed material in the fluidized bed in gasifier 32 at a temperature within the range between about 1000° F. and about 1500° F., preferably between about 1200° F. and about 1400° F., and at a pressure between about 100 psig and about 2000 psig, preferably between about 200 psig and about 800 psig. Due to the equilibrium conditions existing in the bed as a result of the presence of the carbon-alkali metal catalyst and the recycle hydrogen and carbon monoxide injected near the lower end of the bed, the net reaction products will normally consist essentially of methane and carbon dioxide. The ratio of methane to carbon dioxide in the raw product gas thus formed will preferably range from about 1.0 to about 1.4 moles per mole, depending upon the amount of hydrogen and oxygen in the feed coal or other carbonaceous solids. The coal employed may be considered as an oxygenated hydrocarbon for purposes of describing the reaction. Wyodak coal, for example, may be considered as having the approximate formula $CH_{0.84}O_{0.20}$, based on the ultimate analysis of moisture and ash-free coal and neglecting nitrogen and sulfur. The reaction of this coal with steam to produce methane and carbon dioxide is as follows:

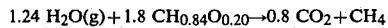

$$1.24\ H_2O(g) + 1.8\ CH_{0.84}O_{0.20} \rightarrow 0.8\ CO_2 + CH_4$$

Under the same gasification conditions, coals of higher oxygen content will normally produce lower methane to carbon dioxide ratios and those of lower oxygen content will yield higher methane to carbon dioxide ratios.

The gas leaving the fluidized bed in gasifier 32 passes through the upper section of the gasifier, which serves as a disengagement zone where particles too heavy to be entrained by the gas leaving the vessel are returned to the bed. If desired, this disengagement zone may include one or more cyclone separators or the like for removing relatively large particles from the gas. The gas withdrawn from the upper part of the gasifier through line 37 will normally contain methane, carbon dioxide, hydrogen, carbon monoxide, unreacted steam, hydrogen sulfide, ammonia, and other contaminants formed from the sulfur and nitrogen contained in the feed material, and entrained fines. This gas is introduced into cyclone separator or similar device 38 for removal of the larger fines. The overhead gas then passes through line 39 into a second separator 41 where smaller particles are removed. The gas from which the solids have been separated is taken overhead from separator 41 through line 42 and the fines are discharged downward through dip legs 40 and 43. These fines are normally returned to the gasifier via line 57.

After entrained solids have been separated from the raw product gas as described above, the gas stream may be passed through suitable heat exchange equipment for the recovery of heat and then processed for the removal of acid gases. Once this has been accomplished, the remaining gas, consisting primarily of methane, hydrogen and carbon monoxide, may be cryogenically separated into a product methane stream and a recycle stream of hydrogen and carbon monoxide which is returned to the gasifier through line 36. Conventional gas processing equipment can be used. Since a detailed description of this downstream gas processing portion of the process is not necessary for an understanding of the invention, it has been omitted.

The fluidized bed in gasifier 32 is comprised of char particles formed as the solid carbonaceous feed material undergoes gasification. The composition of the char particles will depend upon the amount of mineral matter present in the carbonaceous material fed to the gasifier, the amount of the alkali metal compound or mixture of such compounds impregnated into the feed material, and the degree of gasification that the char particles undergo while in the fluidized bed. The lighter char particles, which will have a relatively high content of carbonaceous material, will tend to remain in the upper portion of the fluidized bed. The heavier char particles, which will contain a relatively small amount of carbonaceous material and a relatively large amount of ash and alkali metal residues, will tend to migrate toward the bottom of the fluidized bed. A portion of the heavier char particles is normally withdrawn from the bottom portion of the fluidized bed in order to eliminate ash and thereby prevent it from building up within the gasifier and other vessels in the system.

During the gasification process taking place in reactor 32, alkali metal residues containing water-soluble alkali metal compounds such as carbonates, sulfides and the like, and water-insoluble compounds such as alkali metal aluminosilicates, alkali metal iron sulfides and similar compounds are formed. The water-insoluble compounds are produced by the reaction of the alkali metal constituents with the mineral constituents of the coal and other carbonaceous solids. It has been found that from about 10 to about 50 percent by weight of the potassium carbonate or other alkali metal compound or compounds employed to impregnate the coal prior to gasification will react with the mineral matter to form water-insoluble compounds. To improve the economics of the catalytic gasification process described above and other catalytic conversion processes where alkali metal residues are formed and withdrawn with char and ash from the gasifier or the reaction zone, it has been proposed to leach the char particles with water in a multi-stage countercurrent leaching system to recover the water-soluble constituents. In order to recover the alkali metal constituents tied up in the water-insoluble portion of the alkali metal residues, it has been suggested that the char particles containing the alkali metal residues first be treated with lime in the presence of water at a temperature between 250° F. and 700° F. and then subjected to the multistage countercurrent water wash. Such a treating procedure prior to water leaching converts the water-insoluble alkali metal constituents in the char particles into water-soluble alkali metal constituents which are then recovered in the water leaching system with the other water-soluble constituents. Unfortunately, the effluent from the lime treatment step will contain a large quantity of low density and small size lime particles which are not easily separated from the aqueous leaching liquid present in the various stages of the multistage countercurrent extraction system referred to above. Laboratory studies indicate that the separation of these particles from the aqueous leaching liquid are difficult to achieve with a high degree of efficiency in a short period of time and, therefore, more stages and large equipment are required to effect such separations. This, in turn, results in an expensive extraction system which is costly to operate.

It has now been found that recoveries of alkali metal constituents from the alkali metal residues in the char particles exiting the gasifier at least equivalent to or greater than the recoveries achieved utilizing the lime treatment process referred to above can be obtained by mixing the char particles with water or a recycle aqueous solution and subjecting the resultant slurry to electromagnetic radiation having a frequency between about 0.10 MHz and about $10^5$ MHz. The electromagnetic radiation evidently facilitates the extraction of alkali metal constituents from the water-insoluble compounds that comprise the alkali metal residues. The recycle aqueous solution used to form the slurry is normally produced by water washing the solids exiting the irradiation step. In general, the electromagnetic radiation utilized will comprise radio waves having a frequency between about 0.10 MHz and about $10^3$ MHz or microwaves having a frequency between about $10^3$ MHz and about $10^5$ MHz.

Referring again to FIG. 1, char particles containing carbonaceous material, ash and alkali metal residues are continuously withdrawn from the fluidized bed in gasifier 32 through transfer line 44, passed through a slide valve, not shown in the drawing, cooled, and then passed into slurry tank 46. Here the porous char particles, which will normally have an average particle size in the range between about 150 and 200 microns, are slurried with an aqueous solution containing water-soluble alkali metal constituents injected into the slurry tank through line 48. The solution introduced into tank 46 will normally consist of an alkaline recycle solution containing alkali metal carbonates, hydroxides, and other basic water-soluble constituents produced in a countercurrent, multistage extraction system as described hereinafter. During the slurrying process which takes place in the tank, a portion of the water-soluble constituents present in the alkali metal residues passed into the slurry tank with the char particles from gasifier 32 will dissolve in the water thereby further enriching the solution in alkali metal constituents which tend to increase its pH. Normally, the aqueous portion of the slurry in tank 46 will have a pH between about 10.0 and about 14.5, preferably between about 12.0 and 13.0.

The slurry formed in tank 46 is withdrawn through line 50 and passed by means of pump 52 through line 54 into electromagnetic irradiation zone 56 where it is treated with electromagnetic radiation having frequencies in the radio wave or microwave range. Normally, the slurry is fed to the irradiation zone at atmospheric pressure and at a temperature above ambient temperature but below the boiling point of the slurry. It has been found that the amount of electromagnetic energy necessary to extract the alkali metal constituents from the water-insoluble alkali metal compounds in the alkali metal residues can be substantially reduced if the feed to the zone is increased in temperature. Thus, it may be desirable to operate the gasifier char withdrawal system in such a manner that the char retains some heat prior to its introduction in the slurry tank 46 so that the slurry formed in the tank will be at as high a temperature as is possible under the circumstances.

In electromagnetic irradiation zone 56, the alkali metal residues in the char particles comprising the slurry are subjected to electromagnetic radiation which facilitates the extraction into solution of alkali metal constituents from the alkali metal aluminosilicates and other water-insoluble alkali metal compounds contained in the residues. Evidently, the electromagnetic energy promotes such an extraction without substantially solubilizing the ash constituents or destroying the carbonaceous material in the char. Although it is not completely understood how the electromagnetic energy facilitates the extraction of alkali metal constituents from the water-insoluble alkali metal constituents, it is believed that it promotes the replacement of alkali metal ions in the water-insoluble compounds with hydrogen ions from the water comprising the slurry. Alternatively, or in addition, the electromagnetic radiation may serve as a source of intense energy which rapidly heats the aqueous medium and the internal as well as the external portions of the individual particles in the slurry. This rapid and intense internal heating may either facilitate the diffusion processes of the water-insoluble alkali metal constituents in solution or rupture the individual particles thereby exposing additional water-insoluble constituents to the aqueous medium. The heat generated in the aqueous liquid itself will vary at different points around the liquid-solid interface and this may create large thermal convection currents which can agitate and sweep away solution having a high concentration of dissolved alkali metal constituents from the surface layers of the char particles thus exposing the particle surfaces to fresh aqueous solution.

Electromagnetic irradiation zone 56 will normally be equipped with conventional electromagnetic radiation generating systems which are well known to those skilled in the art. In such systems, electric line current is converted to direct current by a direct current power supply. This direct current energy is then applied to an electromagnetic radiation generator, such as a magnetron or klystron for generating microwaves or a radio frequency tube for generating radio waves, which converts the direct current into electromagnetic energy. The electromagnetic energy is in turn transmitted to the reaction system through a wave guide, coaxial cable or similar device. The frequency of the electromagnetic irradiation generated in zone 56 will normally be in a range from about 0.1 MHz to about $10^5$ MHz, preferably between about $10^2$ MHz and about $10^4$ MHz, and most preferably between about 1000 MHz and about 3000 MHz.

Within the above-recited frequency ranges, the actual frequency used will normally be sufficiently low to provide adequate penetration of the radiation into the aqueous char slurry as determined by the electrical conductivity and the dielectric properties of the slurry, and sufficiently high to allow the radiation to exist within the dimensions of the irradiation zone; i.e., the wave length of the electromagnetic fields must be below cut-off. If the depth of penetration is substantially less then the depth of the slurry in the irradiation zone, agitation of the slurry may be required to provide adequate exposure to the electromagnetic radiation.

The residence time or radiation exposure time of the slurry of char particles and aqueous alkaline solution in electromagnetic irradiation zone 56 will normally depend upon the temperature of the feed to the zone, the size of the solids in the slurry and the power of the electromagentic radiation. For a given power level, the greater the temperature of the feed slurry, the less irradiation time is necessary to extract the alkali metal constituents from the water-insoluble alkali metal compounds in the alkali metal residues. Similarly, the smaller the size of the individual char particles, the shorter is the irradiation time needed to extract a substantial portion of the alkali metal constituents. Normally, the char particles exiting gasifier 32 by line 44 will be of such a small size and high porosity that further crushing or grinding will not be necessary in order to optimize the irradiation time required in zone 56. In general, the power absorption will be sufficiently high to allow a radiation exposure time of less than about 3 minutes. For a power absorption of a few watts per cubic centimeter of slurry, the radiation exposure time will normally range from about 0.2 minutes to about 5 minutes and will typically be between about 2 minutes and about 3 minutes.

As stated previously, the slurry fed to electromagnetic irradiation zone 56 will normally be at atmospheric pressure and at a temperature below the boiling point of the aqueous medium. As the slurry is subjected to electromagnetic radiation in zone 56, the temperature of the slurry will normally increase to a level such that it is at or just below the boiling point of the aqueous medium. In general, the temperature of the slurry in the irradiation zone will be sufficiently high to effect rapid extraction of the alkali metal constituents from the water-insoluble alkali metal constituents in the alkali metal residues and sufficiently low to prevent excessive evaporation of the aqueous medium. Normally, the temperature will range somewhere between about 200° F. and about 230° F. The pressure in the irradiation zone will normally be maintained at about atmospheric pressure. The size and/or power of the generator required to produce the electromagnetic energy needed in the zone to extract the alkali metal constituents from the water-insoluble compounds may be decreased if the temperature of the slurry fed to the zone is increased.

The effluent exiting electromagnetic irradiation zone 56 through line 58 will normally be a slurry of char particles containing alkali metal residues depleted in alkali metal constituents and an aqueous solution enriched in water-soluble alkali metal constituents that were formed in the irradiation zone by the extraction of alkali metal constituents from the water-insoluble compounds in the alkali metal residues. This slurry is passed to centrifuge, hydroclone, filter or similar liquid-solids separation device 60 where the aqueous solution enriched in water-soluble alkali metal constituents is separated from the char particles depleted in alkali metal constituents. The aqueous solution enriched in alkali metal constituents, primarily alkali metal carbonates, hydroxides and similar alkali salts active in promoting the steam gasification of coal and similar carbonaceous solids, produced in separation device 60 is normally recycled through lines 62, 18, and 17 to feed preparation zone 14. Here the coal or similar carbonaceous feed material is impregnated with the alkali metal constituents in the aqueous solution. If the concentration of the alkali metal constituents in the recycle stream is undesirably low, the solution may be concentrated by removing excess water before it is returned to the feed preparation zone.

The char particles removed from separation device 60 will contain enriched liquid containing water-soluble constituents. These water-soluble alkali metal constituents remaining in the particles are recovered by passing the solids through line 64 into water wash zone 66 in which substantially all the remaining water-soluble alkali metal constituents are removed from the solids. The water wash zone will normally comprise a multi-stage countercurrent extraction system in which the char particles are countercurrently contacted with water introduced into the system through line 68. A dilute aqueous solution of water-soluble alkali metal constituents is withdrawn from the recovery unit through line 70 and recycled through line 48 into slurry tank 46 where the solution is mixed with char particles removed from gasifier 32 via line 44. Normally, the water-soluble constituents in the solution will comprise alkali metal carbonates, hydroxides, and the like. Particles containing, among other substances, small amounts of carbonaceous material and ash are withdrawn from water wash zone 66 through line 72. These solids will normally have a low content of alkali metal residues and may be disposed of by landfill, used for construction purposes, or employed in other applications.

The nature and objects of the invention are further illustrated by the results of laboratory tests. The first series of tests illustrates that substantially all of the alkali metal constituents present in gasification char can be recovered by mixing the char with water and treating the resultant slurry with electromagnetic radiation in the microwave range. The second series of tests illustrates that the microwave treatment will result in a substantially greater recovery of alkali metal constituents as compared to heating the slurry in the absence of microwave energy.

In the first series of tests, about 50 milligrams of various samples of char derived from the fluid bed catalytic gasification of Illinois No. 6 coal that had been impregnated with potassium hydroxide were mixed with about 10 ml. of water to form a slurry. The resultant slurry, which was at room temperature, was placed in a non-metallic container inside a microwave oven where the slurry was irradiated with microwaves having a frequency of 2450 MHz for about 3 minutes. Before the char was mixed with water, a separate portion of each char sample was analyzed for total potassium content. After irradiation, the non-metallic container was removed from the oven and its contents filtered to separate the solids from the liquid. The liquid was then analyzed by Inductively Coupled Plasma Emission Spectroscopy (ICPES) to determine the amount of potassium that had been extracted from the char. The results of these tests are set forth below in Table 1.

TABLE 1

| | POTASSIUM RECOVERY FROM GASIFICATION CHAR | |
|---|---|---|
| Char Sample | Weight % K Present | % of K Recovered |
| 1 | 28.6 | 92 |
| 2 | 19.2 | 100 |
| 3 | 24.7 | 81 |
| 4 | 25.3 | 93 |
| 5 | 25.3 | 99 |
| 6 | 26.6 | 100 |

It can be seen from Table 1 that treatment of the char slurry with microwave energy results in substantial recoveries of the potassium present in the char. In all cases except for Sample No. 3, the recovery was 92% or greater. The recovery measured for treatment of Sample No. 3 is believed to be in error since the 81% is substantially lower than any of the other recoveries.

In the second series of tests, 50 milligram samples of a char derived from the gasification of an Illinois No. 6 coal impregnated with potassium hydroxide were mixed with about 10 ml. of water to form slurries. Before the slurries were prepared, a separate sample of the char was analyzed to determine the total amount of potassium present. Several of the slurries were then placed on a hot plate and boiled for times ranging from 2 to 20 minutes. After the end of each boiling the slurry was filtered to separate the solids from the liquid and the liquid was analyzed by ICPES to determine the amount of potassium that had been removed from the char. Several of the other slurries were placed in a nonmetallic container inside a waveguide and irradiated with microwaves having a frequency of 2450 MHz for periods ranging from about 1 minute to about 5 minutes. The power of the microwaves during this test ranged from about 100 to about 600 watts. After irradiation, each slurry was filtered to separate the solids from the liquids and the liquid was analyzed for potassium utilizing ICPES. The results of this series of tests is set forth in FIG. 2.

Figure 2:
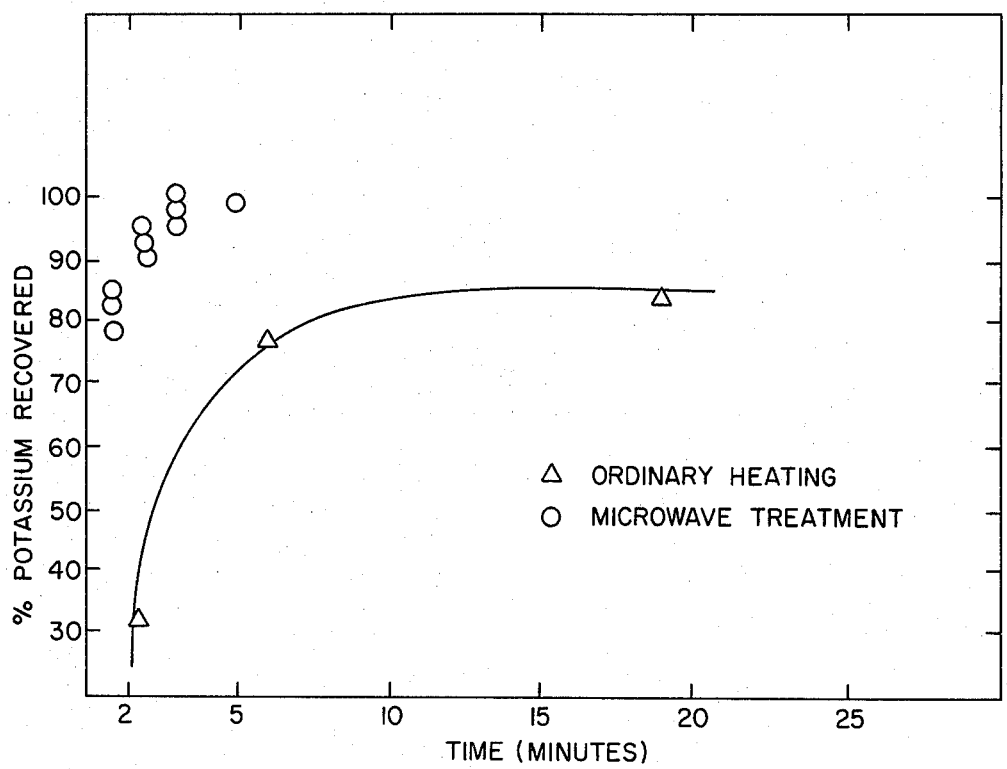
FIG. 2 is a plot comparing the amount of potassium recovered by boiling an aqueous slurry of char produced by the fluid bed gasification of coal impregnated with potassium hydroxide with that recovered by exposing the aqueous char slurry to electromagnetic radiation in the microwave range.

As can be seen from FIG. 2, the amount of potassium extracted by boiling the char in water depended initially on the amount of time that the char was boiled and tended to approach a maximum of about 80% as the time of boiling increased. The amount of potassium extracted using the microwave treatment, however, was significantly greater than the amount that was obtained by boiling the char in water and reached a maximum of about 100% at about 5 minutes of irradiation time. The slight variation in the data points for the microwave treatment could be due to the fact that the power setting on the microwave oven was varied from run to run. The data in FIG. 2 clearly indicate that the microwave treatment has the effect of rapidly extracting alkali metal from water-insoluble alkali metal compounds.

It will be apparent from the foregoing that the invention provides a process which facilitates the recovery of maximum amounts of alkali metal constituents from char particles produced during catalytic gasification and similar high temperatures catalytic conversion processes. As a result the need for costly makeup alkali metal compounds is reduced, thereby lowering the overall cost of the conversion process.

We claim:

1. In a process for the conversion of a solid carbonaceous feed material in the presence of an alkali metal-containing catalyst into liquids and/or gases wherein particles containing alkali metal residues are produced, the improvement which comprises:
    (a) treating said particles containing said alkali metal residues with electromagnetic radiation having a frequency between about 0.10 MHz and about $10^5$ MHz in the presence of water or other aqueous medium to produce particles depleted in alkali metal constituents and an aqueous solution enriched in water-soluble alkali metal constituents; and
    (b) using at least a portion of the water-soluble alkali metal constituents present in said aqueous solution formed in step (a) in said conversion process as at least a portion of the alkali metal constituents comprising said alkali metal-containing catalyst.

2. A process as defined by claim 1 wherein said conversion process comprises gasification.

3. A process as defined by claim 1 wherein said conversion process comprises liquefaction.

4. A process as defined by claim 1 wherein said water-soluble alkali metal constituents present in said aqueous solution comprise potassium constituents.

5. A process as defined by claim 1 wherein said carbonaceous feed material comprises coal.

6. A process as defined by claim 1 wherein said particles comprise char particles containing carbonaceous material, ash, and alkali metal residues.

7. A process as defined by claim 1 wherein said aqueous solution containing said water-soluble alkali metal constituents produced in step (a) is recycled to said conversion process where said alkali metal constituents are used as at least a portion of said alkali metal constituents comprising said alkali metal-containing catalyst.

8. A process as defined by claim 1 wherein said aqueous medium is an alkaline solution obtained by water washing said particles depleted in alkali metal constituents produced in step (a).

9. A process as defined by claim 1 wherein said electromagnetic radiation comprises radio waves having a frequency between about $10^2$ MHz and about $10^3$ MHz or microwaves having a frequency between about $10^3$ MHz and about $10^4$ MHz.

10. A process as defined by claim 1 wherein said electromagnetic radiation comprises microwaves having a frequency between about 1000 MHz and about 3000 MHz.

11. In a process for the production of a methane-containing gas wherein coal is gasified in the presence of a potassium-containing catalyst and char particles containing carbonaceous material, ash, and alkali metal residues are produced, the improvement which comprises:
    (a) treating said char particles containing said carbonaceous material, ash, and alkali metal residues with electromagnetic radiation having a frequency between about $10^2$ MHz and about $10^5$ MHz in the presence of an aqueous alkaline solution to produce char particles depleted in potassium constituents and an aqueous solution enriched in water-soluble potassium constituents; and
    (b) recycling said aqueous solution containing said water-soluble potassium constituents produced in step (a) to said gasification process where said potassium constituents are used as at least a portion of said potassium comprising said potassium-containing catalyst.

12. A process as defined by claim 11 wherein said aqueous alkaline solution is obtained by water washing said char particles depleted in potassium constituents produced in step (a).

* * * * *